United States Patent [19]

Maurel et al.

[11] 4,423,013
[45] Dec. 27, 1983

[54] PROCESS FOR THE PURIFICATION OF SOLUTIONS CONTAINING ALKALI METAL CARBONATE, SULPHATE, HYDROXIDE OR POSSIBLY HYDROGEN CARBONATE, AND ONE AT LEAST OF THE METALS VANADIUM, URANIUM AND MOLYBDENUM

[75] Inventors: Pierre Maurel; Francois Nicolas, both of Aix-en-Provence, France

[73] Assignee: Aluminium Pechiney, Lyons, France

[21] Appl. No.: 246,405

[22] Filed: Mar. 23, 1981

[30] Foreign Application Priority Data

Apr. 2, 1980 [FR] France .................................. 80 07877

[51] Int. Cl.³ ...................... C01G 39/00; C01G 56/00; C11G 31/00
[52] U.S. Cl. ......................................... 423/55; 423/11; 423/58; 423/65
[58] Field of Search ...................... 423/11, 15, 17, 55, 423/58, 65

[56] References Cited

U.S. PATENT DOCUMENTS

| | | | |
|---|---|---|---|
| 2,949,339 | 8/1960 | Marvin | 423/55 |
| 3,151,932 | 10/1964 | Reusser et al. | 423/15 |
| 4,321,235 | 3/1982 | Mouret et al. | 423/15 |

FOREIGN PATENT DOCUMENTS 2460277  2/1981  France .................................. 423/15

*Primary Examiner*—Herbert T. Carter
*Attorney, Agent, or Firm*—McDougall, Hersh & Scott

[57] ABSTRACT

Process for extracting molybdenum from aqueous solutions containing alkali metal carbonate, sulphate, hydroxide or hydrogen carbonate and, primarily, one at least of the metals belonging to the group formed by vanadium, uranium and molybdenum, in the form of alkali metal salts, and mineral and/or organic impurities, said solutions resulting from an ore attack cycle and being taken off after extraction of the metal being sought, in the form of a concentrate, wherein said solutions are caustified by the addition of a suitable amount of lime, converting the carbonate present into alkali metal hydroxide, a first precipitate is separated from the alkali metal hydroxide-rich liquor, said liquor is concentrated until the alkali metal hydroxide content is at most equal to 50%, to cause the production of a second precipitate formed by alkali metal sulphate and molybdate, which is solubilized in an aqueous recycle liquor, said re-dissolution liquor then being treated with sulphide ions and then acidified to give a pH-value of lower than 4.5, in order quantitatively to precipitate the molybdenum which is separated from the mother liquor, washed and dried for use as a source of molybdenum.

7 Claims, 1 Drawing Figure

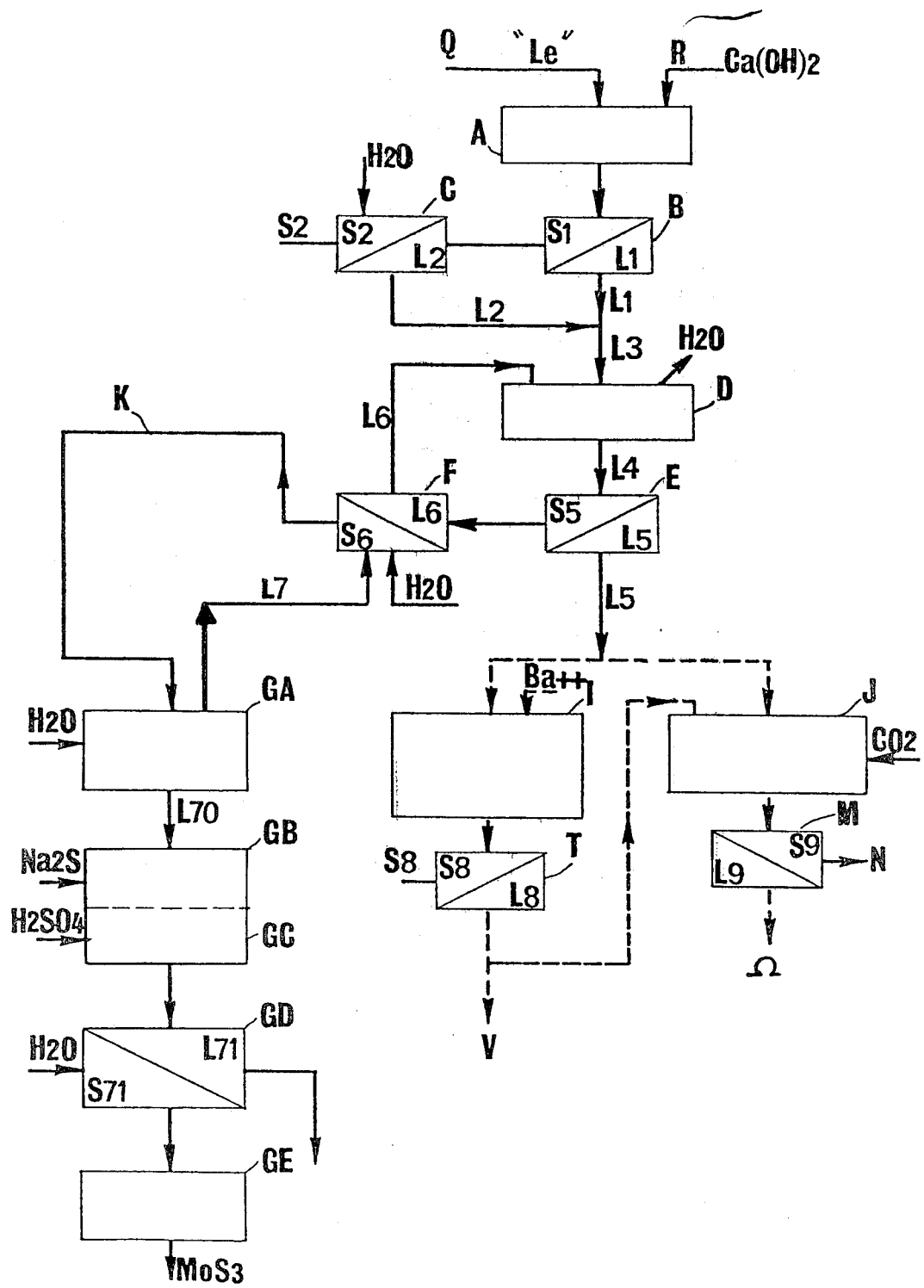

PROCESS FOR THE PURIFICATION OF SOLUTIONS CONTAINING ALKALI METAL CARBONATE, SULPHATE, HYDROXIDE OR POSSIBLY HYDROGEN CARBONATE, AND ONE AT LEAST OF THE METALS VANADIUM, URANIUM AND MOLYBDENUM

The present invention which is an addition to French patent No. 2 404 601 of Sept. 30, 1977 concerns a process for the purification of solutions containing alkali metal carbonate, sulphate, hydroxide or hydrogen carbonate, and one at least of the metals vanadium, uranium and molybdenum.

In French patent No. 2 404 601 of Sept. 30, 1977, the applicants described a process for the purification of solutions containing sodium carbonate, sulphate, hydroxide or hydrogen carbonate, and one at least of the metals belonging to the group formed by vanadium, uranium and molybdenum, in the form of sodium salt.

These solutions resulted from a cycle of attacking a uraniferous or vanadiferous ore which also contains molybdenum as a particular impurity, after precipitation and separation of the material which is to be put to use, using a known method.

Thus, in the case of a uraniferous ore for example, wherein the ore is attacked by means of a sodium carbonate and/or bicarbonate liquor, the solubilised uranium which is present in the liquor after the attack operation was usually precipitated in the form of sodium uranate. The sodium uranate could be converted:
  either into crystallised ammonium uranate, by sulphur-ammonium transposition which consisted of treating the sodium uranate with a solution of ammonium sulphate,
  or into uranium peroxide by sulphuric redissolution and precipitation by introducing hydrogen peroxide.

Irrespective of the method used for precipitation and separation of the uranium, for example in the form of sodium uranate, which is possibly transformed into uranium peroxide, such operations resulted in solutions containing sodium carbonate, sulphate, hydroxide or hydrogen carbonate, which had to be purified before recycling to the ore attack operation. Now, it is indeed known that impurities normally have a detrimental influence on the qualities of the main product sought and the presence thereof at excessively high levels of concentration may cause difficulties in the attack operation using a recycled liquor and/or may result in untimely precipitation phenomena at various points in the production circuits.

In the specialist literature in this art, it is often pointed out that the operation of removing impurities which are present in the circulating liquors is performed at the same time as the sterile substances, in the form of impregnation liquor, as a result of insufficient washing.

Discharging sterile materials which still have a substantial sodium content, or the above-mentioned liquors, into the natural environment, is becoming increasingly unacceptable and prohibited by national laws, because of the irretrievable damage that such effluents may cause to the environment.

Now, if it appears to be desirable to provide for better washing of the sterile materials in order to enhance recovery of the reactants and the product which is to be put to use, on the other hand the amount of impurities present in the circuit increases at the same time.

Accordingly, this gives rise to the necessity to use a process which makes it possible to extract the impurities from the liquors to be treated in a sufficient amount for the proportions of impurities in the liquors not to give rise to the above-mentioned disadvantages.

It is with this in mind that the applicants, in French patent No. 2 404 601 of Sept. 30, 1977, described a process for purification of the above-mentioned solutions, which was characterised in that said solutions were treated at a temperature which was at most equal to the boiling temperature, with an amount of lime which is from 0.1 to 20 times the stoichiometric amount required for converting into free sodium hydroxide the carbonates present, without taking into account the amount of lime necessary for precipitating the insoluble metallic calcium compounds, followed by separation and washing of a first precipitate essentially containing calcium carbonate and a mixture of other organic and inorganic calcium salts, and a liquor which had become enriched in respect of sodium hydroxide, that the mixture of said liquor and the liquor for washing the first precipitate was concentrated by evaporation until the sodium hydroxide content was at most equal to 50%, in order to cause the production of a second precipitate, that the crystals of said second precipitate were separated from their sodium hydroxide-rich mother liquor, and that said sodium hydroxide-rich liquor was recovered.

In that process, the second precipitate essentially comprised sodium sulphate.

As the sodium hydroxide-rich mother liquor which was produced by separation of the sodium sulphate precipitate still contained impurities, it appeared to the applicants that it was desirable to carry out a treatment on said liquor for extracting therefrom the constituents, such as molybdenum, organic materials and the like, which cause difficulties in regard to subsequent use thereof.

Thus, in accordance with that invention, the applicants proposed a treatment for eliminating molybdenum in the form of a sulphide, which treatment comprised acidifying the hydroxide-rich mother liquor which was produced after separation of the sodium sulphate, and precipitating the molybdenum sulphide by the addition of an alkali metal sulphide. In spite of the attraction afforded by such a treatment, serious difficulties were found, which could tend to limit the use thereof. In fact, the treatment required complete neutralisation by means of sulphuric acid of the sodium hydroxide-rich mother liquor from which the sodium sulphate had just been removed. Since the mother liquor was purified in respect of molybdenum by precipitation by means of sulphide ions, it was again necessary to remove the $SO_4^=$ ions which were introduced for the neutralisation operation, and to reconstitute the recycling liquor which was intended for the attack operation, by introducing thereinto the desired amounts of $CO_3^=$ and $HCO_3^-$ ions.

It is because of these problems that, in an application for a patent of addition, No. 78 24843 of Aug. 18, 1978, the applicants proposed a novel process for extracting molybdenum from solutions to be purified containing sodium carbonate, sulphate, hydroxide or hydrogen carbonate, said solutions originating from a uraniferous ore attack cycle and containing molybdenum as a particular impurity after the alkali metal attack on the ore and extraction of the uranium in the form of a concentrate, and being intended for treatment by caustification by introducing lime, which was characterised in that the molybdenum was extracted in the form of a sulphur-bearing compound by the introduction of sulphide ions into an acidified aliquot fraction of said solutions before effecting caustification thereof.

In its essential features, the process for extracting molybdenum from solutions to be purified, resulting from treatment operations on uraniferous ores, comprised the following steps:

before caustification, taking off an aliquot fraction of the solutions to be treated, said fraction being intended to provide for extraction of the major part of the molybdenum in a dissolved conditions, while the remainder of the solutions is passed to the caustification operation, in accordance with the main patent;

acidification of the aliquot fraction of the solutions to be treated by means of an acid agent;

introducing sulphide ions into said acidified aliquot fraction;

separation of the mother liquor-impregnated molybdenum precipitate from a liquor which is still acid but which has a reduce molybdenum content and to which the liquors for washing said precipitate are added;

mixing the aliquot fraction with its reduced molybdenum content, with the fraction of solutions to be purified which has been subjected to the caustification cycle, in accordance with the main patent;

concentration of the liquid fractions originating from the molybdenum purification operation and the caustification step, until a second precipitate comprising sodium sulphate is produced;

separation of the crystals of said second precipitate which is impregnated with a sodium hydroxide-rich mother liquor;

washing the second precipitate with recycling of the washing liquors to the concentration operation, and recovery of the sodium hydroxide-rich liquor.

In comparison with the main patent, the above-defined process afforded the advantage of a lower level of consumption of Ca(OH)$_2$ the introduction of a smaller amount of H$_2$SO$_4$ for neutralising just the aliquot fraction intended for the molybdenum extraction operation, and a low level of consumption of carbon dioxide for regenerating the liquors which are recycled to the attack operation.

In addition, that process made it possible, by concentration, to remove the SO$_4$= ions which were initially present in the solution to be purified, and those which were introduced into the aliqot fraction in order to cause neutralisation thereof and to permit precipitation of the molybdenum.

However, the amounts of H$_2$SO$_4$ added for neutralising the aliquot fraction intended for the operation of purification in respect of molybdenum, and the amounts of CO$_3$= introduced into the liquor from the sodium sulphate separation operation, for recycling said liquor to the ore attack operation, were still considered to be excessive.

It is for this reason that the applicants, continuing their research, found that it was possible to effect extraction of molybdenum by means of a novel process which avoids the above-mentioned disadvantages.

The process according to the invention for the extraction of molybdenum from aqueous solutions to be purified, containing alkali metal carbonate, sulphate, hydroxide or hydrogen carbonate, and which may also contain vanadium and/or uranium, which comprises caustification of said solutions by means of lime to convert the carbonates into alkali metal hydroxides, followed by separation and washing of the above-mentioned calcium carbonate, from a liquor which is enriched in respect of alkali metal hydroxide, concentration by evaporation of the mixture of the alkali metal hydroxide-rich liquor and the liquor for washing the first precipitate, which essentially contains calcium carbonate, until a second precipitate is produced, is characterised in that the second precipitate which is formed by a mixture of alkali metal sulphate and molybdate is solubilised in an aqueous re-dissolution liquor and then the resulting aqueous liquor is treated by means of sulphide ions, causing precipitation of the molybdenum which is subsequently separated from the mother liquor essentially containing alkali metal sulphate, and is then washed and dried.

In its essential features, the novel process for extracting molybdenum from aqueous solutions to be purified, which originate from an ore treatment cycle, comprises the following steps:

(a) caustification of the solutions by means of an amount of lime which is between 0.1 and 20 times and ric amount b 0.5 and 10 times the stoichiometfor converting the carbonate and bicarbonate present into alkali metal hydroxide, (b) separation of a first precipitate which is impregnated with mother liquors and which comprises a mixture of organic and inorganic calcium salts, and an alkali metal hydroxide-enriched liquor which contains an alkali metal sulphate, (c) washing of the first precipitate, to make it possible to extract the impregnation liquor, resulting in washing liquors which are combined with the above-mentioned alkaline liquor which is enriched in respect of alkali metal hydroxide, (d) concentration of the liquor resulting from the mixture by evaporation until a second precipitate which is formed by the mixture of alkali metal sulphate and molybdate is obtained, (e) separation of the crystals of said second precipitate which is impregnated with an alkali metal hydroxide-rich mother liquor, (f) washing the second precipitate with recycling of the washing liquors to the concentration step (d), (g) recovery of the alkali metal hydroxide-rich liquor which may be subsequently carbonated before being recycled to the ore attack operation, (h) redissolution of the second precipitate in water and/or a recycling liquor, (i) introduction of sulphide ions into the second precipitate re-dissolution liquor, (j) acidification of the re-dissolution liquor containing the sulphide ions, causing complete precipitation of the molybdenum sulphide and the formation of a suspension of said sulphide in the aqueous phase, (k) separation of the molybdenum sulphide precipitate from an aqueous alkali metal sulphate-rich liquor, and (l) drying and calcination of the molybdenum sulphide.

In the main patent, caustification of the solutions is generally effected by introducing an amount of lime which is at least equal to the stoichiometric amount required for virtually complete conversion of the alkali metal carbonate present in the liquor into free sodium hydroxide, in accordance with the reaction:

$$M_2CO_3 + Ca(OH)_2 \rightarrow CaCO_3 + 2MOH$$

in which M may be sodium, potassium or ammonium.

When the solutions to be caustified contain metal salts which, with the lime and under the operation conditions involved, are likely to form an insoluble compound, the total amount of lime introduced is the amount of lime which is actually necessary for caustification of the dissolved carbonates and the amount of lime required to precipitate the metal constituents in the form of insoluble calcium compounds. Accordingly, and in order to simplify understanding of the subject of this invention, reference will be made hereinafter only to the amount of lime which is actually required just for caustification of the alkali metal carbonates.

The corresponding temperature of the caustification treatment is at most equal to the boiling temperature of the liquor being treated and is therefore between 20° C. and 100° C. but preferably between 50° C. and 97° C.,

- either by means of a barium compound, making use of the weak solubility of barium organates in the sodium-bearing medium. The amount of barium compound introduced is at least equal to the stoichiometric amount required to permit precipitation and elimination by separation of the organates of that metal,
- or by means of sodium dioxide causing in situ degradation of the organic materials,
- or by means of hydrogen peroxide causing the same degradation,
- or finally by passing said liquor over activated carbon which has the well-known property of retaining the organic components which are present in the mother liquor being treated.

In accordance with a second alternative mode of operation, the sodium-bearing mother liquor may be partially or totally carbonated by bringing it into contact with carbon dioxide in accordance with known means, for example by injecting a large excess of carbon dioxide gas. Depending on the conditions under which this operation is performed, it is possible to produce a sodium carbonate precipitate which can be subsequently separated.

Depending on the characteristics of the alkaline mother liquor at the discharge from the evaporation operation and the uses for which the purified liquor is intended, it is possible to use one or other of the above-mentioned alternative modes of operation, or for such modes to be partially or totally combined.

According to the process of the invention, the second precipitate which comprises a mixture of alkali metal sulphate and molybdate is generally re-dissolved in water and/or an aqueous recycling liquor containing $SO_4^=$ ions. precipitation and filterability of the resulting residue being improved in most cases when the caustification temperature is close to the boiling temperature.

The precipitate essentially comprises calcium carbonate and the excess of lime and, in a minor amount, organic and inorganic calcium salts.

Separation of the first precipitate and the alkaline mother liquor is effected by a known means such as for example flitration, draining, settling, etc.

The mother liquor is then subjected to an operation of concentration by evaporation until the alkali metal hydroxide concentration is at most 50%, causing the simultaneous precipitation of alkali metal molybdate and sulphate. The second precipitate is then collected and is separated from the alkali metal hydroxide-rich mother liquor by a known means and then washed with water or with an aqueous alkali metal sulphate-saturated solution, with the washing liquor being recycled to the concentration step.

As the alkali metal hydroxide-rich mother liquor recovered still contains impurities, it may be desirable to carry out a treatment on that liquor for extracting therefrom the components which give rise to difficulties in subsequent use thereof such as organic materials and the like. Likewise, the mother liquor may be subjected to a conversion treatment before being used in the production cycle.

In accordance with a first alternative mode of operation for extracting the organic materials, the sodium-bearing mother liquor is treated in known manner: The liquor for re-dissolution of the second precipitate is then taken up again to carry out the treatment for elimination of the molybdenum.

The second precipitate which comprises alkali metal sulphate and molybdate is re-dissolved, the molybdenum elimination treatment comprising introducing sulphide ions into the aqueous solution, in an amount close to stoichiometry, then acidifying the reaction medium until the pH-value of the precipitation medium is lower than 4.5.

As the applicants have found, it is desirable for the operation of introducing the sulphide ions into the aqueous solution for re-dissolution of the second precipitate to be performed before acidification of said solution in order to avoid phenomena involving reduction of the medium by the $H_2S$ which is likely to be formed and, consequently, incomplete precipitation of the molybdenum.

The temperature at which the molybdenum precipitation operation is effected is not critical in itself. However, in order to avoid the reducing effects which are due to the $H_2S$ which is likely to be performed, it is preferable for the precipitation operation to be carried out at the minimum possible temperature. In practice, the molybdenum precipitation operation is performed at the temperature of the aqueous liquor which is collected after re-dissolution of the second precipitate.

In order to achieve quantitative precipitation of the molybdenum, the re-dissolution liquor acidification time must be relatively long, that is to say, the operation of introducing the acid into the medium must be effected slowly.

The amount of acid introduced into the re-dissolution liquor is such that the pH-value of the liquor must be lower than 4.5 and preferably always between 1.7 and 1.8.

The invention will be better appreciated by reference to the description of the accompanying diagrammatic drawing which shows a diagrammatic view of the process according to the invention, the solid lines indicating the circuit used when only alkali metal sulphate and carbonate and molybdenum are to be eliminated while the broken lines show the circuits for subjecting the hydroxide-rich mother liquor from the caustification operation, either to complementary purification in respect of the organic materials, or a carbonation operation, by carrying out the above-mentioned additional treatment intended for that purpose, or by performing a complete treatment by successively carrying out the abovedescribed additional treatments.

The alkaline solutions to be treated, as indicated at Le, and the lime required, are introduced into A by way of Q and R. The slurry produced after treatment with the lime is introduced into the reactor B for separation of a cake S1 and a liquor L1 containing certain solubilised impurities. The mother liquors of the cake S1 are extracted in C by means of an amount of water which is introduced thereinto. The mother liquors L2 which are extracted in that way are mixed with the liquor L1, forming the liquor L3. The resulting cake S2 which is extracted from C essentially comprises calcium carbonate.

The liquor L3 which is formed by the mixture of liquors L1 and L2 is passed into D for concentration in respect of alkali metal hydroxide by evaporation of water, causing the precipitation of an alkali metal molybdate and sulphate mixture.

The slurry L4 issuing from the concentration step is introduced into E for separation of a liquor L5 and a cake S5.

The cake S5 which essentially comprises the alkali metal molybdate and sulphate mixture is carried over into F where it is subjected to rinsing either by means of a solution L7 of alkali metal sulphate, with recycling of the rinsing liquor L6 to D, or by means of water.

The cake S6 which is impregnated with the rinsing liquor is recovered in K.

The alkali metal hydroxide-rich liquor L5 from E may contain dissolved impurities such as for example various organic and inorganic salts which it may be desirable to remove.

If the organic materials present are to be removed from the liquor L5, the liquor is introduced into I with for example a suitable amount of a barium compound, causing precipitation of the barium organates. The slurry coming from I is then introduced into T for separation of a cake S8 and a liquor L8 which may be collected in V or recycled to another stage of the process such as for example J.

Likewise, if it is desirable for the alkali metal hydroxide-rich liquor L5 to be carbonated, that liquor is introduced into J where it undergoes carbonation by the injection of $CO_2$. The resulting slurry may be used in the form as produced or it may be treated in M to separate the cake S9 which comprises the alkali metal carbonate, and a carbonated liquor L9 which may be collected in Ω or recycled to J for producing a solid alkali metal carbonate.

However, it is clearly evident that the hydroxide-rich liquor L5 may undergo these two treatments in succession, depending on the impurities which should desirably be removed and depending on the uses for which the liquor is intended after purification.

The cake S6 which is formed by the alkali metal molybdate and sulphate mixture is then taken up in K from which it is passed into GA where it is re-dissolved in water and/or a recycling liquor, giving a liquor L70.

The liquor L70 is then introduced into GB where it is treated with an amount of alkali metal sulphide which is close to stoichiometry, thus causing the beginnings of precipitation of the molybdenum. The resulting suspension is then acidified in GC by the introduction of sulphuric acid until the pH-value obtained is between 1.7 and 1.8, causing quantitative precipitation of the molybdenum.

The suspension issuing from the precipitation step is then introduced into GD for separation of a liquor L71 which contains the alkali metal sulphate which is in solution and which is subsequently treated by a known process such as cooling, evaporation . . . , until precipitation of the sodium sulphate occurs, and a molybdenum sulphide cake S71.

After washing with water, the cake S71 is introduced into GE where it is subjected to a drying operation resulting in molybdenum sulphide which is useful as a source of molybdenum.

The process according to the invention is remarkable by virtue of its flexibility of use. This is highly important because, if the presence of alkali metal sulphate in the solutions to be purified is a general factor, as well as the presence of alkali metal carbonate, the other constituents present may vary qualitatively and quantatively, depending on the origin of the solutions to be treated. Thus, the process is found to be particularly attractive from the environmental point of view, by virtue of the absence of the discharge of liquid waste materials into the environment.

Moreover, the process has other advantages, among which mention may first be made of the possibility of recycling a concentrated solution of alkali metal hydroxide, or a solution of alkali metal carbonate, possibly a suspension of that salt or even alkali metal carbonate in the solid state, but also the possibility of adjusting as required the amount of alkali metal sulphate which is recycled, and also the amounts of impurities (molybdenum, organic materials, vanadium, etc).

The advantages of the process according to the invention will be much better appreciated from the following Example which is given by way of illustration:

EXAMPLE (illustrated by the drawing)

The process according to the invention was used to treat a sodium hydroxide-rich solution which was taken off at the end of a uraniferous ore attack cycle, after precipitation and separation of the sodium uranate. The solution Le was of the following composition by weight:

NaOH: 7.5 Kg,
$Na_2CO_3$: 23.71 kg,
$Na_2SO_4$: 5.51 kg,
Uranium: 0.005 kg,
Molybdenum: 3.344 kg,
$H_2O$ and various: 561.4 kg.

The 601.47 kg of this solution was introduced into A with 65.02 kg of limewash containing 15.02 kg of CaO, for effecting virtually total caustification of the carbonate present, by heating and maintaining it at a temperature of 95° C. for a period of about 3 hours.

The resulting slurry was then transferred into B for separation of the solid phase S1 and the liquid phase L1. The cake S1 was then rinsed in C with 25 kg of water. The mother liquors which impregnated the cake S1 were thus extracted and combined with the liquor L1 resulting from the separation operation in B.

The cake S2 which weighed 33.15 kg was of the following composition by weight:

$CaCO_3$: 22.35 kg
Uranium: 0.005 kg
$Ca(OH)_2$ excess: 3.3 kg
Impregnation $H_2O$ and various: 7.5 kg The liquor L3 formed by the mixture of the liquors L1 and L2 weighed 658.34 kg and was of the following composition by weight:

NaOH: 27.48 kg,
$Na_2SO_4$: 5.97 kg,
Molybdenum: 3.62 kg,

Water and various: 621.29 kg.

It was passed into D for concentration by evaporation of 546.5 kg of water.

The slurry issuing from D was transferred into E for separation of a cake S5 and a liquor L5.

The cake S5 was then subjected to a rinsing operation in F, using 3.98 kg of a solution L7 of $Na_2SO_4$ originating from GA. The washing liquor L6 was recycled to D in order to undergo concentration therein.

The washed cake S6 represented a weight of 6.02 kg and was of the following composition by weight:

$Na_2SO_4$: 4.97 kg,
Molybdenum: 0.62 kg,
Impregnation $H_2O$: 0.43 kg.

The liquor L5 from the separation operation E represented a weight of 109.95 kg and was of the following composition:

NaOH: 27.48 kg,
$Na_2SO_4$: 1.65 kg,
Molybdenum: 3.08 kg,
Water and various: 77.75 kg.

In accordance with the main patent, the liquor L5, upon discharge from E, may be subject to various conversion operations before being introduced again into the operating cycle.

The cake S6 is then taken up again in K and is passed into GA where it is re-dissolved by means of 24.84 kg of water, giving the above-mentioned liquor L7 and a liquor L70 weighing 26.45 kg and containing:

$Na_2SO_4$: 4.32 kg,
Molybdenum: 0.54 kg,
Water and various: 21.59 kg.

The liquor L70 was treated in GB with 1.32 kg of $Na_2S$ and in GC with 2.21 kg of $H_2SO_4$.

This resulted in a suspension of molybdenum sulphide which was introduced into GD for separation of a cake S71 which was washed with 1 kg of water, and a liquor L71 comprising the washing waters.

The liquor L71 weighed 29.65 kg and contained 7.52 kg of $Na_2SO_4$.

After washing, the cake S71 represented a weight of 1.08 kg, containing 0.54 kg of molybdenum.

We claim:

1. A process for extracting molybdenum from aqueous solutions to be purified which contain alkali metal carbonate, sulphate, hydroxide or hydrogen carbonate and at least one other of the metals selected from the group consisting of vanadium and uranium, in the form of alkali metal salts, and mineral and/or organic impurities comprising treating the solution with lime at a temperature below the boiling point of the solution to precipitate insoluble calcium salts as a first precipitate, separating the first precipitate from the remaining alkali metal hydroxide-enriched liquor, concentrating the remaining liquor to provide a solution wherein the alkali metal hydroxide is present in an amount up to 50% by weight to produce a second precipitate containing a mixture of alkali metal molybdate and sulphate, separating the second precipitate from the liquor, dissolving the second precipitate in an aqueous liquor including sulphide ions and then acidifying the liquor to quantitatively precipitate molybdenum sulphide, separating the precipitated molybdenum sulphide from the remaining liquor which essentially contains alkali metal sulphate and separating the molybdenum sulphide from the remaining liquor.

2. A process for extracting molybdenum from aqueous solutions to be purified as claimed in claim 1 wherein the alkali metal of the carbonate, sulphate, hydroxide or hydrogen carbonate is selected from the group consisting of sodium, potassium and ammonium.

3. A process for extracting molybdenum from aqueous solutions to be purified as claimed in claim 1 wherein the aqueous liquor in which the second precipitate of alkali metal sulphate and molybdate is dissolved is water.

4. A process for extracting molybdenum from aqueous solutions to be purified as claimed in claim 1 wherein the aqueous liquor in which the the second precipitate of alkali metal sulphate and molybdate is dissolved is a recycled liquor containing alkali metal sulphate.

5. A process for extracting molybdenum from aqueous solutions to be purified as claimed in claim 1 wherein the aqueous liquor in which the the second precipitate of alkali metal sulphate and molybdate is dissolved comprises a mixture of water and a recycled liquor containing alkali metal sulphate.

6. A process for extracting molybdenum from aqueous solutions to be purified as claimed in claim 1 wherein the second precipitate comprising alkali metal sulphate and molybdate is washed before being dissolved with a fraction of the liquor formed upon the dissolution of said precipitate.

7. A process for extracting molybdenum from aqueous solutions to be purified as claimed in claim 1 wherein the aqueous liquor resulting from dissolution of the second precipitate, after the addition of a substantially stoichiometric amount of sulphide ions, is acidified with sulphuric acid to a pH between 1.7 and 1.8.

* * * * *